United States Patent
Shimizu et al.

(10) Patent No.: US 6,881,788 B2
(45) Date of Patent: Apr. 19, 2005

(54) POLYURETHANE RESIN WATER DISPERSION AND AQUEOUS POLYURETHANE ADHESIVE

(75) Inventors: Hyoue Shimizu, Osaka (JP); Hiroyuki Shiraki, Osaka (JP)

(73) Assignee: Mitsui Takeda Chemicals, Inc., Tokyo (JP)

(*) Notice: Subject to any disclaimer, the term of this patent is extended or adjusted under 35 U.S.C. 154(b) by 0 days.

(21) Appl. No.: 10/218,656

(22) Filed: Aug. 15, 2002

(65) Prior Publication Data

US 2003/0060589 A1 Mar. 27, 2003

(30) Foreign Application Priority Data

Aug. 21, 2001 (JP) ...................................... 2001-249853

(51) Int. Cl.⁷ .............................................. C08G 18/42
(52) U.S. Cl. ...................................... 524/840; 528/905
(58) Field of Search ........................... 524/840; 528/905

(56) References Cited

U.S. PATENT DOCUMENTS

| | | | |
|---|---|---|---|
| 4,098,743 A | * | 7/1978 | Scriven et al. |
| 4,870,129 A | | 9/1989 | Henning et al. ............ 524/597 |
| 5,312,865 A | * | 5/1994 | Hoefer et al. |
| 5,688,356 A | | 11/1997 | Sagiv |

FOREIGN PATENT DOCUMENTS

| | | |
|---|---|---|
| DE | 39 03 796 A | 8/1990 |
| EP | 0 953 623 | 11/1999 |
| JP | 9-157625 | 6/1997 |
| WO | 90/06330 | 6/1990 |

* cited by examiner

*Primary Examiner*—Rachel Gorr
(74) *Attorney, Agent, or Firm*—Wenderoth, Lind & Ponack, L.L.P.

(57) ABSTRACT

Polyurethane resin water dispersion being good in storage stability and excellent in initial adhesion and resistance to moist heat, and aqueous polyurethane adhesive employing the polyurethane resin water dispersion. The polyurethane resin water dispersion is produced in the manner that polyisocyanate is allowed to react with polycaprolactone polyol comprising polycaprolactone polyol having a number average molecular weight of not less than 3,000 and active-hydrogen-group-containing compound having anionic group, to synthesize isocyanate terminated prepolymer, first, and, then, the isocyanate terminated prepolymer thus produced is allowed to react with polyamine in water. The use of the polyurethane resin water dispersion can produce the aqueous polyurethane adhesive having improved storage stability, initial adhesion and resistance to moist heat.

7 Claims, No Drawings

POLYURETHANE RESIN WATER DISPERSION AND AQUEOUS POLYURETHANE ADHESIVE

BACKGROUND OF THE INVENTION

1. Field of the Invention

The present invention relates to polyurethane resin water dispersion and to aqueous polyurethane adhesive employing the polyurethane resin water dispersion.

2. Description of the Prior Art

Polyurethane resin is in wide use for applications to adhesive in terms of excellence in adhesion, flexibility and mechanical strength.

Organic solvent polyurethane resin in which polyurethane resin is dissolved in organic solvent has been generally used as the polyurethane adhesive. However, the organic solvent does not necessarily have a good influence on human body and environment and involves a risk of catching fire. In view of this, as a substitution for this organic solvent polyurethane adhesive, aqueous polyurethane adhesive comprising polyurethane resin water dispersion in which polyurethane resin is dispersed in water is now developing with great speed, with increasing interests to the environmental sanitation in recent years.

For example, Japanese Laid-open (Unexamined) Patent Publication No. Sho 63 (1988)-69882 proposes as an example of the aqueous polyurethane adhesive self-emulsifiable aqueous polyurethane adhesive produced by the reaction of aliphatic polyisocyanate with adipic-acid polyester polyol and polyol having carboxylic acid group or sulfonic acid group.

Japanese Laid-open (Unexamined) Patent Publication No. Hei 9 (1997)-157625 proposes, for example, in its example 4 that 3-isocyanatomethyl-3,5,5,-trimethylcyclohexyl isocyanate is allowed to react with polycaprolactonediol having a number average molecular weight of 2,000 and dimethylolpropionic acid to synthesize isocyanate terminated prepolymer, first, and, then, the isocyanate terminated prepolymer thus synthesized is allowed to react with ethylene diamine in water, to prepare polyurethane resin water dispersion, for use as the aqueous polyurethane adhesive.

The polyurethane resin water dispersion comprising adipic-acid polyester polyol as proposed by Japanese Laid-open (Unexamined) Patent Publication No. Sho 63 (1988)-69882 cited above is excellent in adhesion and thus is in general use. However, the polyurethane resin water dispersion comprising adipic-acid polyester polyol has the disadvantages that it is low in heat resistance at temperatures exceeding crystalline melting point; that the ester linkage of adipate is so susceptible to hydrolysis that the storage stability and the adhesion performance after storage of the water dispersion can easily deteriorate; and that even after adhesive bonding, significant performance deterioration due to hydrolysis is incurred in the presence of moisture, particularly at temperatures exceeding crystalline melting point.

On the other hand, the polyurethane resin water dispersion comprising polycaprolactone polyester polyol as proposed by Japanese Laid-open (Unexamined) Patent Publication No. Hei 9 (1997)-157625 cited above has good heat resistance and the advantage that the ester linkage of caprolactone being hardly susceptible to hydrolysis. Accordingly, it has good water resistance, storage stability for water dispersion, and adhesion performance after storage, as compared with the polyurethane resin water dispersion comprising adipic-acid polyester polyol mentioned above. On the other hand, it has the disadvantage of being low in initial adhesion so that it cannot provide any adhesion force able to bring base material into destruction in a short time, as the organic solvent polyurethane resin adhesive, for example.

SUMMARY OF THE INVENTION

It is an object of the present invention to provide new polyurethane resin water dispersion being good in storage stability and excellent in initial adhesion and resistance to moist heat, and aqueous polyurethane adhesive employing the polyurethane resin water dispersion.

The present invention provides polyurethane resin water dispersion produced by allowing isocyanate terminated prepolymer, which is produced by reaction of polyisocyanate with polycaprolactone polyol comprising polycaprolactone polyol having a number average molecular weight of not less than 3,000 and active-hydrogen-group-containing compound having anionic group, to react with polyamine in water.

In the polyurethane resin water dispersion of the present invention, it is preferable that the polycaprolactone polyol comprises the polycaprolactone polyol having a number average molecular weight of not less than 3,000 and polycaprolactone polyol having a number average molecular weight of not more than 2,500. Further, the polycaprolactone polyol preferably comprises polycaprolactone polyol having a number average molecular weight of 3,000–6,000 and polycaprolactone polyol having a number average molecular weight of 1,000–2,500. In this polyurethane resin water dispersion, the polycaprolactone polyol having a number average molecular weight of not more than 2,500 is contained in a proportion of 0.5–20 mol per mol of the polycaprolactone polyol having a number average molecular weight of not less than 3,000.

Also, the polyurethane resin water dispersion of the present invention preferably contains 5-50 mili equivalents of anionic group per 100 g of polyurethane resin produced by reaction of the isocyanate terminated prepolymer and polyamine and also contains the polyurethane resin in a proportion of not less than 50 weight %.

It is preferable that the polyurethane resin water dispersion of the present invention further comprises a surface active agent. Preferably, the surface active agent comprises nonionic surface active agent including no ionic functional group.

Further, the present invention covers an aqueous polyurethane adhesive comprising the polyurethane resin water dispersion mentioned above. Preferably, the aqueous polyurethane adhesive further comprises isocyanate curing agent.

The polyurethane resin water dispersion of the present invention is good in heat resistance and also is hardly susceptible to hydrolysis. This can provide improvements in water resistance, storage stability for the water dispersion, and adhesion performance after storage and also develop excellent initial adhesion. Thus, the aqueous polyurethane adhesive employing the polyurethane resin water dispersion of the present invention is excellent in storage stability, initial adhesion, and resistance to moist heat, and as such can allow its excellent adhesion performance to develop for a variety of materials.

DETAILED DESCRIPTION OF THE PREFERRED EMBODIMENTS

Polyurethane resin water dispersion of the present invention is produced in the following manner. First, polyisocyanate is allowed to react with polycaprolactone polyol comprising polycaprolactone polyol having a number average molecular weight of not less than 3,000 and active-hydrogen-group-containing compound having anionic group to synthesize isocyanate terminated prepolymer.

The polyisocyanate used is not limited to any particular one. The polyisocyanates that may be used include those usually used for producing polyurethane. For example, aliphatic polyisocyanate, alicyclic polyisocyanate, aralkyl polyisocyanate, aromatic polyisocyanate and their derivatives and modifications can be cited.

The aliphatic polyisocyanates that may be used include, for example, aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate, and aliphatic triisocyanates, such as lysine ester triisocyanate, 1,4,8-triisocyanato octane, 1,6,11-triisocyanato undecane, 1,8-diisocyanato-4-isocyanato methyloctane, 1,3,6-triisocyanato hexane, and 2,5,7-trimethyl-1,8-diisocyanato-5-isocyanatomethyl-octane.

The alicyclic polyisocyanates that may be used include, for example, alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (popular name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl) cyclohexane (popular name: hydrogenated xylene diisocyanate) or mixtures thereof, and norbornane diisocyanate, and alicyclic triisocyanates, such as 1,3,5-triisocyanatocyclohexane, 1,3,5-trimethylisocyanato cyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2. 2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1) heptane.

The aralkyl polyisocyanates that may be used include, for example, aralkyl diisocyanates, such as 1,3- or 1,4-xylene diisocyanate or mixtures thereof, ω,ω'-diisocyanato-1,4-diethyl benzene, 1,3- or 1,4-bis(1-isocyanato-1-methylethyl) benzene (popular name: tetramethylxylene diisocyanate) or mixture thereof, and aralkyl triisocyanates, such as 1,3,5-triisocyanatomethyl benzene.

The aromatic polyisocyanates that may be used include, for example, aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixture thereof, 2,4- or 2,6-tolylene diisocyanate or mixture thereof, 4,4'-toluidine diisocyanate, and 4,4'-diphenylether diisocyanate, and aromatic triisocyanates, such as triphenylmethane-4,4',4"-triisocyanate, 1,3,5-triisocyanato benzene, and 2,4,6-triisocyanato toluene, and aromatic tetraisocyanates, such as 4,4'-diphenylmethane-2,2',5,5'-tetraisocyanate.

The derivatives of polyisocyanate that may be used include, for example, polyisocyanates' dimer, trimer, biuret, allophanate, carbodiimide, uretdione, oxadiazinetrione, polymethylene polyphenyl polyisocyanate (crude MDI, polymelic MDI) and crude TDI.

Further, the modifications of polyisocyanate that may be used include, for example, modification of polyol and modification of polyamine which are produced by allowing said polyisocyanate or derivative thereof to react with low-molecular-weight polyol or low-molecular-weight polyamine, mentioned later, at an equivalent ratio at which an isocyanate group of polyisocyanate is more than a hydroxyl group of low-molecular-weight polyol or an amino group of low-molecular-weight polyamine.

These polyisocyanates may be used singly or in combination of two or more. Of these polyisocyanates, aliphatic diisocyanate and alicyclic diisocyanate may preferably be used.

The polycaprolactone polyol is polyester polyol produced by ε-caprolactone being ring-opening polymerized with polyol initiator or polyamine initiator. The polyol initiators that may be used include, for example, diols, such as ethylene glycol, propylene glycol, 1,4-butylene glycol, 1,3-butylene glycol, 1,6-hexanediol, neopentyl glycol, bisphenol A, and resorcin, triols, such as glycerin, 1,2,6-hexanetriol, and 1,1,1-tris(hydroxymethyl) propane, tetraols, such as pentaerythritol, erythritol, and methyl glucoside, hexaols, such as sorbitol and dipentaerythritol, and octanols, such as sucrose.

The polyamine initiators that may be used include, for example, diamines, such as ethylenediamine, propylenediamine, hexamethylenediamine, and hydrazine, and at least trifunctional polyamines, such as diethylenetriamine, triethylenetetramine, and tetraethylene-pentamine. These initiators may be used singly or in combination of two or more. Of these initiators, diols and diamines may preferably be used.

In the present invention, the polycaprolactone polyols include the polycaprolactone polyol having a number average molecular weight of not less than 3,000. Specifically, in the present invention, the polycaprolactone polyol having a number average molecular weight of not less than 3,000 may be used alone, or may be used in combination with polycaprolactone polyol having a number average molecular weight of less than 3,000, with the polycaprolactone polyol having a number average molecular weight of not less than 3,000 as an indispensable component. It is to be noted, however, that the use of the polycaprolactone polyol having a number average molecular weight of less than 3,000 alone cannot provide improved initial adhesion.

To be more specific, it is preferable to use the polycaprolactone polyol having a number average molecular weight of not less than 3,000, or preferably polycaprolactone polyol having a number average molecular weight of 3,000–6,000, or further preferably polycaprolactone polyol having a number average molecular weight of 3,500–4,500, in combination with polycaprolactone polyol having a number average molecular weight of not more than 2,500, or preferably polycaprolactone polyol having a number average molecular weight of 1,000–2,500, or further preferably polycaprolactone polyol having a number average molecular weight of 1,500–2,500.

The use of the polycaprolactone polyol having a number average molecular weight of not less than 3,000 alone can provide improved initial adhesion, while it has low initial tack such that contact bonding failure may be incurred when adhesive bonding, leading to a deficiency in initial adhesion and thus to deterioration of adhesion performance, rather than improvement of it. Due to this, the polycaprolactone polyol having a number average molecular weight of not less than 3,000 is preferably used in combination with the polycaprolactone polyol having a number average molecular weight of not more than 2,500. This combined use can provide improved initial adhesion and also can develop the initial tack satisfactorily to ensure the excellent adhesive properties.

It should be noted that when polycaprolactone polyol having a number average molecular weight in excess of 6,000 is used for the polycaprolactone polyol having a number average molecular weight of not less than 3,000, there is a possibility that crystallinity may increase so excessively that the initial tack may deteriorate. On the other hand, when polycaprolactone polyol having a number average molecular weight of less than 1,000 is used for the polycaprolactone polyol having a number average molecular weight of not more than 2,500, there is a possibility that crystallinity may be deteriorated so excessively that improved adhesive performances cannot be provided, even when mixed.

Preferably, the polycaprolactone polyol having a number average molecular weight of not less than 3,000 and the polycaprolactone polyol having a number average molecular weight of not more than 2,500 are mixed in a proportion of 0.5–20 mol, or preferably 0.8–10 mol, of polycaprolactone polyol having a number average molecular weight of not more than 2,500 per mol of polycaprolactone polyol having a number average molecular weight of not less than 3,000. When the number of moles is less than this numeric, there is the possibility that improvement in initial tack may not be provided. On the other hand, when the number of moles is in excess of this numeric, there is the possibility that the initial adhesion may deteriorate.

Among the polycaprolactone polyols cited above, polycaprolactonediol is preferably used.

The active-hydrogen-group-containing compound having anionic group includes compounds having an anionic group, such as a carboxyl group, a sulfonyl group, a phosphate group, and a betaine-structure-containing group, such as sulfobetaine, and also containing an active hydrogen group able to react with an isocyanate group, such as a hydroxyl group and an amino group.

Though the active-hydrogen-group-containing compound having anionic group is not limited to any particular one, the compounds having one anionic group and two or more active hydrogen groups can be cited as the preferable one. Specifically, the active-hydrogen-group-containing compounds having carboxyl group include, for example, dihydroxylcarboxylic acids, such as 2,2-dimethylolacetic acid, 2,2-dimethylollactic acid, 2,2-dimethylolpropionic acid, 2,2-dimethylolbutanoic acid, 2,2-dimethylolbutyric acid, and 2,2-dimethylolvaleric acid, and diaminocarboxylic acids, such as lysine and arginine.

The active-hydrogen-group-containing compounds having sulfonyl group include, for example, N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, and 2,4-diamino-5-toluenesulfonic acid.

The active-hydrogen-group-containing compounds having phosphate group include, for example, 2,3-dihydroxypropylphenylphosphate.

The active-hydrogen-group-containing compounds having betaine-structure-containing group include, for example, sulfobetaine-group-containing compounds produced by reaction of tertiary amines, such as N-methyldiethanolamine and 1,3-propanesultone.

Further, modified alkylene oxides produced by adding alkylene oxides, such as ethylene oxide and propylene oxide, to the active-hydrogen-group-containing compounds having those anionic groups can also be cited.

The active-hydrogen-group-containing compounds having the anionic groups may be used singly or in combination of two or more. Of the active-hydrogen-group-containing compounds having the anionic groups, the active-hydrogen-group-containing compound having the carboxylic group can be preferably used.

In the present invention, together with polycaprolactone polyol and the active-hydrogen-group-containing compound having the anionic group, low-molecular-weight polyol and low-molecular-weight polyamine may be allowed to react with polyisocyanate, for synthesizing isocyanate terminated prepolymer.

The low-molecular-weight polyols that may be used include, for example, low-molecular-weight diols, such as ethylene glycol, propane diol, 1,4-butylene glycol, 1,3-butylene glycol, 1,2-butylene glycol, 1,6-hexanediol, neopentyl glycol, alkane (C7-C22) diol, diethylene glycol, triethylene glycol, dipropylene glycol, cyclohexanedimethanol, alkane-1,2-diol (C17-C20), bisphenol A hydride, 1,4-dihydroxy-2-butene, 2,6-dimethyl-1-octene-3,8-diol, bishydroxyethoxy benzene, xylene glycol, and bishydroxyethylene terephthalate, low-molecular-weight triols, such as glycerin, 2-mehtyl-2-hydroxymehtyl-1,3-propanediol, 2,4-dihydroxy-3-hydroxymethyl pentane, 1,2,6-hexanetriol, trimethylolpropane, 2,2-bis (hydroxymethyl)-3-butanol, and other aliphatic triols (C8–24), and low-molecular-weight polyols having not less than four hydroxyl groups, such as tetramethylol methane, D-sorbitol, xylitol, D-mannitol, and D-mannit.

The low-molecular-weight polyamines that may be used include, for example, low-molecular-weight diamines, such as ethylenediamine, propylenediamine, hexamethylenediamine, hydrazine, 1,2-diaminoethane, 1,2-diaminopropane, 1,3-diaminopentane, 1,6-diaminohexane, diaminotoluene, bis-(4-aminophenyl)methane, and bis-(4-amino-3-chlorophenyl)methane, and low-molecular-weight amines having not less than three amino groups, such as diethylenetriamine, triethylenetetramine, tetraethylenepentamine, pentaethylenehexamine, and 2,2'-diaminodiethylamine.

The low-molecular-weight polyols also include polyalkylene polyol produced by addition polymerizing alkylene oxide, such as ethyleneoxide and propylene oxide, with said low-molecular-weight polyol and/or said low-molecular-weight polyamine.

The low-molecular-weight polyol and the low-molecular-weight polyamine may be used singly or in combination of two or more. Of these low -molecular-weight polyol and low-molecular-weight polyamine, those having a number average molecular weight in the range of 62–500 are preferable. The low-molecular-weight diol and the low-molecular-weight triol are preferable.

For synthesizing the isocyanate terminated prepolymer, for example, the polyisocyanate, the polycaprolactone polyol, the active-hydrogen-group-containing compound having the anionic group, and, if necessary, the low-molecular-weight polyol and/or the low-molecular-weight polyamine can be mixed at an equivalent ratio of exceeding 1, or preferably 1.1–10, of the isocyanate group to the active hydrogen group (hydroxyl group and amino group) (isocyanate group/active hydrogen group) and can be allowed to react by a known polymerization process, such as bulk polymerization or solution polymerization.

In the bulk polymerization, for example, the polycaprolactone polyol and the active-hydrogen-group-containing compound having the anionic group, and if necessary, the low-molecular-weight polyol and/or the low-molecular-weight polyamine may be added to polyisocyanate with stirring in the stream of nitrogen, so as to be allowed to react for about one hour to a few hours at a reaction temperature in the range of 75–85° C.

In the solution polymerization, the polyisocyanate, the polycaprolactone polyol, and the active-hydrogen-group-containing compound having the anionic group, and if necessary, the low-molecular-weight polyol and/or the low-molecular-weight polyamine may be added to organic solvent, so as to be allowed to react for about one hour to a few hours at a reaction temperature in the range of 20–80° C. The organic solvents that may be used include, for example, low-boiling solvents that are inactive to isocyanate groups, hydrophilic, and easy to be eliminated, such as acetone, methyl ethyl ketone, ethyl acetate, and tetrahydrofuran. In the present invention, the solution polymerization is preferably used in that it is easier to adjust reactivity and viscosity.

For this reaction, a known urethane catalyst, such as amine-based, tin-based and lead-based catalyst, may be used, if desired. Also, unreacted monomers of the polyisocyanate may be eliminated from the obtained isocyanate terminated prepolymer by known eliminating means, such as distillation and extraction.

In this reaction, the polyol components used, i.e., polycaprolactone polyol and active-hydrogen-group-containing compound having anionic group and, if necessary, low-molecular-weight polyol and/or low-molecular-weight polyamine are mixed, for example, at the rate of 0.01–10 parts by weight, or preferably 0.01–5 parts by weight, of low-molecular-weight polyol and/or low-molecular-weight polyamine mixed, if desired, per 100 parts by weight of polycaprolactone polyol and also at such a rate that the active-hydrogen-group-containing compound having anionic group can usually contain 2–100 mili equivalents, or preferably 5–50 mili equivalents, or further preferably not less than 6 mili equivalents to less than 20 mili equivalents, of anionic group per 100 g of polyurethane resin mentioned later. As long as the equivalent of the anionic group is in this range, even when the solid content is 50 weight % or more, good dispersibility can be ensured, as mentioned later.

Further, for the synthesis of isocyanate terminated prepolymer, it is preferable to add a neutralizing agent before and after the reaction, to neutralize the isocyanate terminated prepolymer so that anionic group can form salt. The neutralizing agents used include, for example, amines, such as trimethylamine, triethylamine, tri-n-propylamine, tributylamine, and triethanolamine, alkali metal hydroxides, such as potassium hydroxide and sodium hydroxide, and others, such as ammonia. The amount of neutralizing agent added is preferably in the range of 0.4–1.2 equivalents, or preferably 0.6–1.00 equivalents, per equivalent of anionic group.

The isocyanate terminated prepolymer thus produced is a prepolymer of polyurethane having isocyanate groups at the terminals of molecules, and an isocyanate group content thereof is preferably in the range of 0.2–4.5 weight %, or preferably 0.5–3.0 weight %.

Then, the isocyanate terminated prepolymer thus produced is allowed to react with polyamine in water, in order to produce the polyurethane resin water dispersion of the present invention. As a result of this, the polyurethane resin water dispersion in which polyurethane resin is dispersed in water with the isocyanate terminated prepolymer extended in chain by polyamine is produced.

The polyamine used is not limited to any particular one, as long as it is a component having not less than two amino groups. The polyamines that may be used include, for example, polyamines, such as ethylenediamine, 1,3-propanediamine, 1,4-butanediamine, 1,6-hexamethylenediamine, 1,4-cyclohexanediamine, 3-aminomethyl-3,5,5-trimethylcyclohexylamine, piperazine, 2,5-dimethylpiperazine, isophorone diamine, 4,4'-cyclohexylmethanediamine, norbornanediamine, hydrazine, diethylenetriamine, triethylenetriamine, 1,3-bis(aminomethyl)cyclohexane, and xylenediamine, and aminoalcohols, such as hydroxyethylhydrazine, hydroxyethyl diethylenetriamine, N-(2-aminoethyl)ethanolamine, and 3-aminopropanediol.

These polyamines may be used singly and in combination of two or more. These polyamines may be in the masked form, as ketimine, ketazine, or amine salt.

The isocyanate terminated prepolymer and the polyamine can be allowed to react with each other in water, for example, in the following manner. First, water is mixed in isocyanate terminated prepolymer so that the isocyanate terminated prepolymer can be dispersed in water and, then, polyamine is mixed with that mixture to allow the isocyanate terminated prepolymer to undergo the chain extension reaction by polyamine.

When water is mixed in the isocyanate terminated prepolymer, it is preferable that an amount of water enough for the isocyanate terminated prepolymer to be dispersed therein, e.g., 20–500 parts by weight per 100 parts by weight of isocyanate terminated prepolymer, is slowly introduced into the isocyanate terminated prepolymer with stirring. As a result of this, the isocyanate terminated prepolymer water dispersion in which isocyanate terminated prepolymer is dispersed in water is prepared.

Then, when the polyamine is mixed with said mixture, an amount of polyamine to establish an equivalent ratio of 0.8–1.2 of the isocyanate group of the isocyanate terminated prepolymer to the amino group of the polyamine (isocyanate group/amino group) may be rapidly dropped into the prepared isocyanate terminated prepolymer water dispersion with stirring (within a short time within which the reaction of the isocyanate group of the isocyanate terminated prepolymer with water does not proceed yet). Preferably, the dropping of the polyamine is performed at a temperature of 30° C. or less. After completion of the dropping, the stirring continues further to complete the reaction at room temperature, for example. After this chain extension reaction, polyurethane resin in which the isocyanate terminated prepolymer chain is extended by the polyamine is produced in the dispersed-in-water state.

After the completion of the reaction, in the case of the polyurethane resin synthesized by the solution polymerization, the organic solvent is eliminated therefrom, for example, by heating it at adequate temperature at reduced pressure.

For the purpose of improving the stability of polyurethane resin water dispersion, a surface active agent may be mixed in the polyurethane resin water dispersion thus produced within the limits of the water resistance being not harmed.

The surface active agent used is not limited to any particular one. The surface active agents that may be used include, for example, anionic surface active agents, such as fatty acid salt, alkyl sulfate, alkylbenzene sulfonate, alkylnaphthalene sulfonate, alkyl sulfosuccinate, and polyoxyethylene alkyl suflate, nonionic surface active agents, such as polyoxyethylene alkyl ether, polyoxyalkylene alkyl ether, derivative of polyoxyethylene, sorbitan fatty acid ester, polyoxyethylene sorbitan fatty acid ester, polyoxyethylene sorbitol fatty acid ester, glycerin fatty acid ester, polyoxyethylene alkylamine, and alkylalkanolamide, and cationic and amphoteric ion surface active agents, such as alkylamine salt, quaternary ammonium salt, alkylbetaine, and amineoxide. These surface active agents may be used singly or in combination of two or more. It is to be noted on the use of the surface active agent that when a surface active agent having an ionic functional group is used, it may interact with an anionic group of the polyurethane resin to incur deterioration of the stability of polyurethane resin in water. Accordingly, nonionic surface active agents including no ionic functional groups should preferably be used.

Though no particular limitation is imposed on the proportion of the surface active agent mixed, the surface active agent should preferably be mixed, for example, in the proportion of 0.01–10 parts by weight, or preferably 0.1–5 parts by weight, per 100 parts by weight of polyurethane resin. When the surface active agent is mixed in the proportion of less than that, there is the possibility that the effect originating from the mixture of the surface active agent may not be developed, while on the other hand, when mixed in the proportion of more than that, the water resistance may deteriorate.

The surface active agent can be mixed in various ways without any particular limitation. For example, the surface active agent may be mixed with the isocyanate terminated prepolymer which is not yet dispersed in water. It may be mixed in the polyurethane resin water dispersion with the polyurethane resin dispersed in water. In the solution polymerization, it may be mixed after the elimination of the organic solvent. Further, it may also be mixed in numbers at adequate stages.

It is to be noted that the polyurethane resin thus produced contains 2–100 mili equivalents, or preferably 5–50 mili equivalents, or further preferably not less than 6 mili equivalents to less than 20 mili equivalents, of anionic group per 100 g of polyurethane resin.

It is preferable that the polyurethane resin water dispersion is finally prepared so as to contain polyurethane resin of not less than 50 weight % as a solid content. Preparing of the polyurethane resin water dispersion so as to contain the polyurethane resin of not less than 50 weigh % as a solid content can provide the result of facilitating the drying process at a later adhesive bonding process and thus providing improved workability. The water dispersion of the polyurethane resin water dispersion has usually a pH in the range of approximately 7–9.

Thus, since the polyurethane resin water dispersion thus produced employs the polycaprolactone polyol comprising the polycaprolactone polyol having a number average molecular weight of not less than 3,000, the polyurethane resin water dispersion is good in heat resistance and also is hardly susceptible to hydrolysis. This can provide improvements in water resistance, storage stability for the water dispersion, and adhesion performance after storage and also develop the excellent initial adhesion, thus providing an adhesion force able to bring base material into destruction (substrate failure) in a short time, as the organic solvent polyurethane resin adhesive, for example.

Hence, the polyurethane resin water dispersion of the present invention can be suitably used for aqueous polyurethane adhesive having excellent storage stability, initial adhesion and resistance to moist heat.

When the polyurethane resin water dispersion of the present invention is used as the aqueous polyurethane adhesive, it is preferable that the polyurethane resin in the polyurethane resin water dispersion is used as a base material and further a known curing agent is mixed in that polyurethane resin water dispersion. The known curing agents that may be used include, for example, isocyanate curing agent, epoxy curing agent, melamine curing agent, carbodiimide curing agent, oxazoline curing agent, and aziridine curing agent. The isocyanate curing agent is preferably used. The mixture of the isocyanate curing agent can provide further improved adhesion performance.

No particular limitation is imposed on the isocyanate curing agents used, as long as it is dispersible in water. The isocyanate curing agents that may be used include, for example, polyoxyethylene modified polyisocyanate in which polyisocyanate or its derivative is modified by polyoxyethylene polyol, and emulsified polyisocyanate in which polyisocyanate, its derivative, or polyol modified polyisocyanate is emulsified by a known emulsifier (surface active agent). These isocyanate curing agents may be used singly or in combination of two or more. Of these isocyanate curing agents, polyoxyethylene modified polyisocyanate is preferably used.

An amount of isocyanate curing agent to be mixed is preferably at a rate of 1–30 parts by weight, or preferably 5–20 parts by weight, per 100 parts by weight of polyurethane resin in the polyurethane resin water dispersion.

In addition, curing catalysts and various additives, such as plasticizer, antifoaming agent, leveling agent, mildewproofing agent, antirust, delusterant, fire retardant, thixotropic agent, tackifier, thickening agent, lubricant, antistatic agent, surface active agent, reaction retardant, oxidation inhibitor, ultraviolet absorption agent, hydrolysis inhibitor, weather resistant stabilizer, dye, inorganic pigment, organic pigment, and body color, may be mixed in the aqueous polyurethane adhesive of the present invention, if desired.

For example, when choosing thickening agent from among these, association type urethane thickening agent, ether thickening agent, or alkali viscosity improvement type acrylic thickening agent, and further inorganic thickening agent and natural polymer thickening agent, etc. may be used singly or in combination of two or more.

The aqueous polyurethane adhesive of the present invention thus produced can be adhesive bonded to a variety of materials and is particularly suitable for adhesive bonding to metals, plastics, polymeric materials, inorganic materials, paper, and wood. The aqueous polyurethane adhesive of the present invention can be used for various purposes including wrapping use, adhesives for shoes (soles), and package films for food products.

EXAMPLES

While in the following, the present invention will be described in further detail with reference to Examples and Comparative Examples, the present invention is not limited to any illustrated Examples.

Example 1

(Preparation of Isocyanate Terminated Prepolymer)

100 parts by weight of polycaprolactonediol having a number average molecular weight of 4,000 (TONE1270 (brand name) available from The Dow Chemical Company) was dehydrated in a vacuum at 110° C. and then was cooled down to 60° C. after dehydration. Then, with this polycaprolactonediol, 111 parts by weight of acetone was slowly added to 5.0 parts by weight of hexamethylenediisocyanate, 4.4 parts by weight of isophorone diisocyanate (VESTANAT IPDI (brand name) available from Huls Corporation), and 1.6 parts by weight of dimethylolbutanoic acid (DMBA (brad name) available from Nippon Kasei Chemical Co., Ltd.) with stirring, with the temperature adjusted to 50–55° C., so that they were allowed to react until the rate of reaction comes to be not less than 98%. Thereafter, 1.0 parts by weight of triethylamine was added to the reactant to produce acetone solution of isocyanate terminated prepolymer.

(Preparation of Polyurethane Resin Water Dispersion)

While the acetone solution of the isocyanate terminated prepolymer thus obtained was stirred, 113 parts by weight of distilled water was added slowly to produce milk-white isocyanate terminated prepolymer water dispersion. Thereafter, 1.3 parts by weight of N-(2-aminoethyl) ethanolamine (Aminoalcohol EA (brand name) available from Nippon Nyukazai Co., Ltd.) was dropped rapidly into the dispersion to undergo chain extension reaction. In the chain extension reaction, the reaction temperature was adjusted to be 30° C. or less. Then, after it kept on stirring for one hour at room temperature, the acetone was eliminated therefrom at temperature of 40–50° C. at reduced pressure to thereby produce polyurethane resin water dispersion having a solid content of 50 weight %, viscosity of 198 mPa·s/25° C., and pH of 7.8.

Examples 2–12 and Comparative Examples 1–5

In the mixing formulation shown in TABLE 1 and TABLE 2, the polyurethane resin water dispersions were prepared in the same operation as in Example 1.

However, in Example 12, after the preparation of polyurethane resin water dispersion, the surface active agent was mixed therein.

TABLE 1

| Mixing Formulation | Examples | | | | | | | | | | | |
|---|---|---|---|---|---|---|---|---|---|---|---|---|
| (parts by weight) | 1 | 2 | 3 | 4 | 5 | 6 | 7 | 8 | 9 | 10 | 11 | 12 |
| Polyisocyanate | | | | | | | | | | | | |
| HDI | 5.0 | 5.3 | 5.9 | 6.0 | 6.6 | 7.0 | 6.9 | 5.5 | 5.4 | 7.2 | 7.4 | 5.9 |
| IPDI | 4.4 | 4.6 | 5.2 | 5.3 | 5.8 | 6.2 | 6.1 | 4.9 | 4.7 | 6.3 | 6.5 | 5.2 |
| Polycaprolactone diol | | | | | | | | | | | | |
| Mn = 530 | | | | | | | 11.7 | | | | | |
| Mn = 1,000 | | | | | 20 | | | | | | | |
| Mn = 2,000 | | | 33.3 | 33.3 | | | | 71.4 | 20 | 14.3 | 83.3 | 90.8 | 33.3 |
| Mn = 4,000 | 100 | 100 | 66.7 | 66.7 | 80 | | 88.3 | 28.6 | 80 | 85.7 | 16.7 | 9.1 | 66.7 |
| Low-molecular-weight polyol | | 0.2 | | 0.2 | | | | | | | | |
| TMP | | | | | | | | | | | | |
| Anionic-group-containing compound DMBA | 1.6 | 1.6 | 1.6 | 1.6 | 1.6 | 1.6 | 1.6 | 1.6 | 1.6 | 1.6 | 1.6 | 1.6 |
| Neutralizing agent TEA | 1.0 | 1.0 | 1.0 | 1.0 | 1.0 | 1.1 | 1.0 | 1.0 | 1.0 | 1.1 | 1.1 | 1.0 |
| Organic Solvent Acetone | 111 | 112 | 113 | 113 | 114 | 115 | 115 | 112 | 112 | 115 | 115 | 113 |
| Polyamine EA | 1.3 | 1.3 | 1.3 | 1.3 | 1.3 | 1.4 | 1.3 | 1.3 | 1.3 | 1.4 | 1.3 | 1.3 |
| Distilled water | 113 | 114 | 115 | 115 | 116 | 117 | 117 | 114 | 114 | 118 | 118 | 115 |
| Surface active agent MS-110 | — | — | — | — | — | — | — | — | — | — | — | 1.2 |
| Solid content (weight %) | 50 | 50 | 50 | 50 | 50 | 50 | 50 | 50 | 50 | 50 | 50 | 50 |
| Viscosity (mPa · s/25° C.) | 198 | 300 | 170 | 400 | 420 | 850 | 210 | 380 | 720 | 300 | 210 | 380 |
| pH | 7.8 | 7.9 | 7.6 | 7.8 | 8.0 | 8.0 | 8.2 | 7.9 | 7.9 | 8.2 | 8.1 | 7.6 |
| Storage stability (Appearance after 7 days' storage at 50° C.) | ○ | ○ | ○ | ○ | ○ | ○ | ○ | ○ | ○ | ○ | ○ | ○ |

TABLE 2

| Mixing Formulation | Comparative Examples | | | | |
|---|---|---|---|---|---|
| (parts by weight) | 1 | 2 | 3 | 4 | 5 |
| Polyisocyanate | | | | | |
| HDI | 7.9 | 8.5 | 6.4 | 7.9 | 8.2 |
| IPDI | 7.0 | 7.5 | 5.6 | 7.0 | 7.2 |
| Polycaprolactone diol | | | | | |
| Mn = 2,000 | | | | 100 | 100 |
| Polybutylene adipate | | | | | |
| Mn = 2,000 | 100 | 100 | | | |
| Mn = 3,000 | | | 100 | | |
| Low-molecular-weight polyol | | | | | |
| 1,4-BG | | | | | 0.5 |
| TMP | | 0.5 | 0.3 | | |
| Anionic-group-containing compound DMBA | 2.0 | 2.1 | 1.8 | 2.0 | 1.7 |
| Neutralizing agent TEA | 1.3 | 1.3 | 1.2 | 1.3 | 1.1 |
| Organic solvent Acetone | 117 | 118 | 114 | 117 | 117 |
| Polyamine EA | 1.3 | 1.6 | 1.3 | 1.4 | 1.4 |
| Distilled water | 120 | 121 | 117 | 120 | 120 |
| Solid content (weight %) | 50 | 50 | 50 | 50 | 50 |
| Viscosity (mPa · s/25° C.) | 860 | 600 | 270 | 300 | 105 |

TABLE 2-continued

| Mixing Formulation | Comparative Examples | | | | |
|---|---|---|---|---|---|
| (parts by weight) | 1 | 2 | 3 | 4 | 5 |
| pH | 8.1 | 8.4 | 7.6 | 8.2 | 8.0 |
| Storage stability (Appearance after 7 days' storage at 50° C.) | ○ | ○ | ○ | ○ | ○ |

The raw materials and the abbreviations in TABLE 1 and TABLE 2 are as follows.
Polyisocyanate
   HDI: Hexamethylene diisocyanate
   IPDI: Isophorone diisocyanate
Polycaprolactonediol
   Number of average molecular weight of 530: TONE0201 (available from The Dow Chemical Company)
   Number of average molecular weight of 1,000: TONE2221 (available from The Dow Chemical Company)
   Number of average molecular weight of 2,000: TONE0249 (available from The Dow Chemical Company)
   Number of average molecular weight of 4,000: TONE1270 (available from The Dow Chemical Company)
Low-Molecular-Weight Polyol
   1,4-BG: 1,4-butylene glycol
   TMP: Trimethylolpropane
Anionic-Group-Containing Compound
   DMBA: Dimethylolbutanoic acid
Neutralizaing Agent
   TEA: Triethylamine
Polyamine
   EA: N-(2-aminoethyl)ethanolamine
Surface Active Agent
   MS-110: polyoxyethylene alkyl ether (Emulgen MS-110 (brand name) available from Kao Corporation)
Evaluation
1) Storage Stability After the water dispersion of the polyurethane resin water dispersion produced in Examples and Comparative examples were stored for seven days at 50° C., the dispersibility was visually observed. The results are shown in TABLE 1 and TABLE 2. In TABLE 1 and TABLE 2, the mark "○" indicates a uniformly dispersed state.

2) Adhesion Performance
(1) Preparation of Aqueous Polyurethane Adhesive

In preparation for aqueous polyurethane adhesives, the polyurethane resin water dispersions prepared in the Examples and Comparative Examples were each put in two different states, one of which is the normal state in which the polyurethane resin water dispersions remained in the original state and another of which is the stored state that the polyurethane resin water dispersions were stored for seven days at 50° C. Then, 5 parts by weight of polyoxyethylene modified hexamethylene diisocyanate trimer (TAKENATE WD-730 (brand name) available from Mitsui Takeda Chemicals, Inc.) per 100 parts by weight of polyurethane resin water dispersion was mixed in each of the polyurethane resin water dispersions thus prepared, to prepare the aqueous polyurethane adhesives.

(2) Evaluation of Adhesion Performance

High-density foamed EVA (Ethylene-vinyl acetate copolymer) and flexible PVA (polyvinyl chloride) were adhesive bonded to each other by using the aqueous polyurethane adhesives thus produced, to evaluate the initial adhesion, initial tack and resistance to moist heat of those test samples.

Specifically, a high-density foamed EVA sheet (30 mm×100 mm×10 mm) and a flexible PVC sheet (30 mm×100 mm×2 mm) were prepared as base material. Both base materials were fully degreased with ethyl acetate, first. Then, the high-density foamed EVA was treated with a primer UV66 (available from TAIWAN MAXBOND Co., Ltd.), while the flexible PVC was treated with a primer VC-3K (available from TAIWAN MAXBOND Co., Ltd.). Then, the aqueous polyurethane adhesives were applied to the both base materials with brush and dried at 55° C. This step was repeated twice. Thereafter, the base materials were adhesive bonded to each other with pressure of 40N/cm for ten seconds, with their adhesive surfaces softened by heat contacting with each other.

(Initial Adhesion)

After having bonded with pressure, the 180 degree peel strength (N/cm, peel speed of 50 mm/min.) of each test sample was measured one minute later, ten minutes later and one hour later. The results are shown in TABLE 3 and TABLE 4.

(Initial Tack)

Immediately after each aqueous polyurethane adhesive applied to the both base materials with brush was dried for six minutes at 55° C., the base materials were brought into contact with each other, to judge the presence of the tack and measure the time for the tack to be held. The results are shown in TABLE 3 and TABLE 4. In TABLE 3 and TABLE 4, "<5" indicates less than 5 minutes, "10<" indicates more than 10 minutes and "5–10" indicates a period between 5 minutes or more and 10 minutes or less.

(Resistance to Moist Heat)

After each test sample was allowed to stand for five days at room temperature after bonded, they were stored for seven days in a thermo-hygrostat of temperature of 70° C. and relative humidity of 95% and further were allowed to stand for two days at room temperature, to measure the 180 degree peel strength (N/cm, peel speed of 50 mm/min.) of each test sample. The results are shown in TABLE 3 and TABLE 4 given below.

In TABLE 3 and TABLE 4, "E-material destructed" represents the state wherein material fractures were found in the high-density foam EVA (surface peelings did not occur on the adhesive surface between the high-density foam EVA and the flexible PVA). When any number is present instead of "E-material destructed", the number represents a peel strength for the state wherein the surface peelings occurred on the adhesive surface between the high-density foam EVA and the flexible PVA.

TABLE 3

| Adhesion performance | Examples | | | | | |
|---|---|---|---|---|---|---|
| | 1 | 2 | 3 | 4 | 5 | 6 |
| Normal state physical properties | | | | | | |
| Initial adhesion | | | | | | |
| 1 min. later (N/cm) | 42 | 41 | 39 | 42 | 45 | 41 |
| 10 min later (N/cm) | E-material destructed | E-material destructed | E-material destructed | E-material destructed | E-material destructed | 45 |
| 1 hr. later (N/cm) | E-material destructed | E-material destructed | E-material destructed | E-material destructed | E-material destructed | E-material destructed |
| Initial tack (Min.) | <5 | <5 | 10< | 10< | 5–10 | <5 |
| Resistance to moist heat (N/cm) | E-material destructed | E-material destructed | E-material destructed | E-material destructed | E-material destructed | E-material destructed |
| Physical properties after 7 days' storage at 50° C. | | | | | | |
| Initial adhesion | | | | | | |
| 1 min. later (N/cm) | 41 | 40 | 53 | 48 | 40 | 40 |
| 10 min later (N/cm) | E-material destructed | E-material destructed | E-material destructed | E-material destructed | E-material destructed | 43 |
| 1 hr. later (N/cm) | E-material destructed | E-material destructed | E-material destructed | E-material destructed | E-material destructed | E-material destructed |
| Initial tack (Min.) | <5 | <5 | 10< | 10< | 5–10 | <5 |
| Resistance to moist heat (N/cm) | E-material destructed | E-material destructed | E-material destructed | E-material destructed | E-material destructed | E-material destructed |

| Adhesion performance | Examples | | | | | |
|---|---|---|---|---|---|---|
| | 7 | 8 | 9 | 10 | 11 | 12 |
| Normal state physical properties | | | | | | |
| Initial adhesion | | | | | | |
| 1 min. later (N/cm) | 37 | 45 | 47 | 42 | 40 | 45 |
| 10 min later (N/cm) | 45 | E-material destructed | E-material destructed | E-material destructed | 45 | E-material destructed |
| 1 hr. later (N/cm) | E-material destructed | E-material destructed | E-material destructed | E-material destructed | E-material destructed | E-material destructed |
| Initial tack (Min.) | 10< | 5–10 | <5 | 10< | 10< | 10< |
| Resistance to moist heat (N/cm) | E-material destructed | E-material destructed | E-material destructed | E-material destructed | E-material destructed | E-material destructed |

TABLE 3-continued

| Physical properties after 7 days' storage at 50° C. | | | | | | |
|---|---|---|---|---|---|---|
| Initial adhesion | | | | | | |
| 1 min. later (N/cm) | 35 | 35 | 35 | 35 | 38 | 45 |
| 10 min later (N/cm) | 50 | E-material destructed | 50 | E-material destructed | 45 | E-material destructed |
| 1 hr. later (N/cm) | E-material destructed | E-material destructed | E-material destructed | E-material destructed | E-material destructed | E-material destructed |
| Initial tack (Min.) | 10< | 10< | <5 | 10< | 10< | 10< |
| Resistance to moist heat (N/cm) | 45 | E-material destructed | E-material destructed | 45 | 35 | E-material destructed |

E-material destructed: Destruction of base material in high-density foam EVA

TABLE 4

| Adhesion performance | Comparative Examples | | | | |
|---|---|---|---|---|---|
| | 1 | 2 | 3 | 4 | 5 |
| Normal state physical properties | | | | | |
| Initial adhesion | | | | | |
| 1 min. later (N/cm) | 27 | 24 | 28 | 25 | 27 |
| 10 min. later (N/cm) | 27 | 30 | 32 | 30 | 35 |
| 1 hr. later (N/cm) | 50 | 40 | 40 | 50 | 55 |
| Initial tack (Min) | 10< | 10< | 10< | 10< | 10< |
| Resistance to moist heat (N/cm) | 7 | 10 | 15 | 35 | 42 |
| Physical properties after 7 days' storage at 50° C. | | | | | |
| Initial adhesion | | | | | |
| 1 min. later (N/cm) | 20 | 21 | 25 | 24 | 27 |
| 10 min. later (N/cm) | 25 | 27 | 33 | 35 | 38 |
| 1 hr. later (N/cm) | 33 | 35 | 37 | 50 | 55 |
| Initial tack (Min.) | 10< | 10< | 10< | 10< | 10< |
| Resistance to moist heat (N/cm) | 3 | 5 | 5 | 15 | 20 |

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. Polyurethane resin water dispersion produced by allowing an isocyanate terminated prepolymer, which is produced by reaction of polyisocyanate with polycaprolactone polyol comprising polycaprolactone polyol having a number average molecular weight of 3500–4500, and polycaprolactone polyol having a number average molecular weight of not more than 2500, and an active-hydrogen-group-containing compound having anionic group, to react with polyamine in water, to produce the polyurethane resin, wherein the content of anionic group in the polyurethane resin is 6–20 mili equivalents of anionic group per 100 g of the polyurethane resin.

2. The polyurethane resin water dispersion according to claim 1, wherein the polycaprolactone polyol having a number average molecular weight of not more than 2,500 is contained in a proportion of 0.5–20 mol per mol of the polycaprolactone polyol having a number average molecular weight of 3500–4500.

3. The polyurethane resin water dispersion according to claim 1, which contains the polyurethane resin in a proportion of not less than 50 weight %.

4. The polyurethane resin water dispersion according to claim 1, which further comprises a surface active agent.

5. The polyurethane resin water dispersion according to claim 4, wherein the surface active agent comprises nonionic surface active agent including no ionic functional group.

6. An aqueous polyurethane adhesive comprising a polyurethane resin water dispersion produced by allowing isocyanate terminated prepolymer, which is produced by reaction of polyisocyanate with polycaprolactone polyol comprising polycaprolactone polyol having a number average molecular weight of 3500–4500, and polycaprolactone polyol having a number average molecular weight of not more than 2500, and an active-hydrogen-group-containing compound having anionic group, to react with polyamine in water, to produce the polyurethane resin, wherein the content of anionic group in the polyurethane resin is 6–20 mili equivalents of anionic group per 100 g of the polyurethane resin.

7. The aqueous polyurethane adhesive according to claim 6, which further comprises isocyanate curing agent.

* * * * *